(12) United States Patent
Muramatsu et al.

(10) Patent No.: US 7,746,563 B2
(45) Date of Patent: Jun. 29, 2010

(54) LARGE MAGNIFICATION FACTOR ZOOM LENS

(75) Inventors: Yuuichi Muramatsu, Saitama (JP); Akio Arakawa, Saitama (JP)

(73) Assignee: Tamron Co., Ltd., Saitama-Shi (JP)

( * ) Notice: Subject to any disclaimer, the term of this patent is extended or adjusted under 35 U.S.C. 154(b) by 278 days.

(21) Appl. No.: 11/812,495

(22) Filed: Jun. 19, 2007

(65) Prior Publication Data

US 2007/0297067 A1 Dec. 27, 2007

(30) Foreign Application Priority Data

Jun. 21, 2006 (JP) .............................. 2006-171066

(51) Int. Cl.
*G02B 15/14* (2006.01)
(52) U.S. Cl. ...................... 359/687; 359/676
(58) Field of Classification Search .................. 359/687, 359/676
See application file for complete search history.

(56) References Cited

U.S. PATENT DOCUMENTS

| | | | | |
|---|---|---|---|---|
| 4,695,133 A * | 9/1987 | Kitagishi et al. | ............. | 359/685 |
| 6,101,042 A * | 8/2000 | Sato | ............. | 359/684 |
| 6,437,923 B1 | 8/2002 | Yamada | | |
| 6,650,475 B1 * | 11/2003 | Hamano | ............. | 359/557 |
| 6,791,762 B2 | 9/2004 | Yamada | | |
| 2005/0083584 A1 * | 4/2005 | Ito et al. | ............. | 359/687 |

FOREIGN PATENT DOCUMENTS

| | | |
|---|---|---|
| JP | 8-179212 A | 7/1996 |
| JP | 11-174327 A | 7/1999 |
| JP | 2000-089117 A | 3/2000 |
| JP | 2002-236255 A | 8/2002 |
| JP | 2003-241097 A | 8/2003 |
| JP | 2005-331697 A | 12/2005 |

* cited by examiner

*Primary Examiner*—Ricky L Mack
*Assistant Examiner*—James R Greece
(74) *Attorney, Agent, or Firm*—Foley & Lardner LLP

(57) ABSTRACT

This large magnification factor zoom lens includes, in an order arranged from an object side, a first lens group having a positive refractive power, a second lens group having a negative refractive power, a third lens group having a positive refractive power, and a fourth lens group having a positive refractive power. The third lens group includes, in an order arranged from the object side, a positive lens, a positive lens, a positive meniscus lens having a larger radius of curvature on an image surface side, and a negative lens. The positive lens has an aspherical surface on an object side.

9 Claims, 4 Drawing Sheets

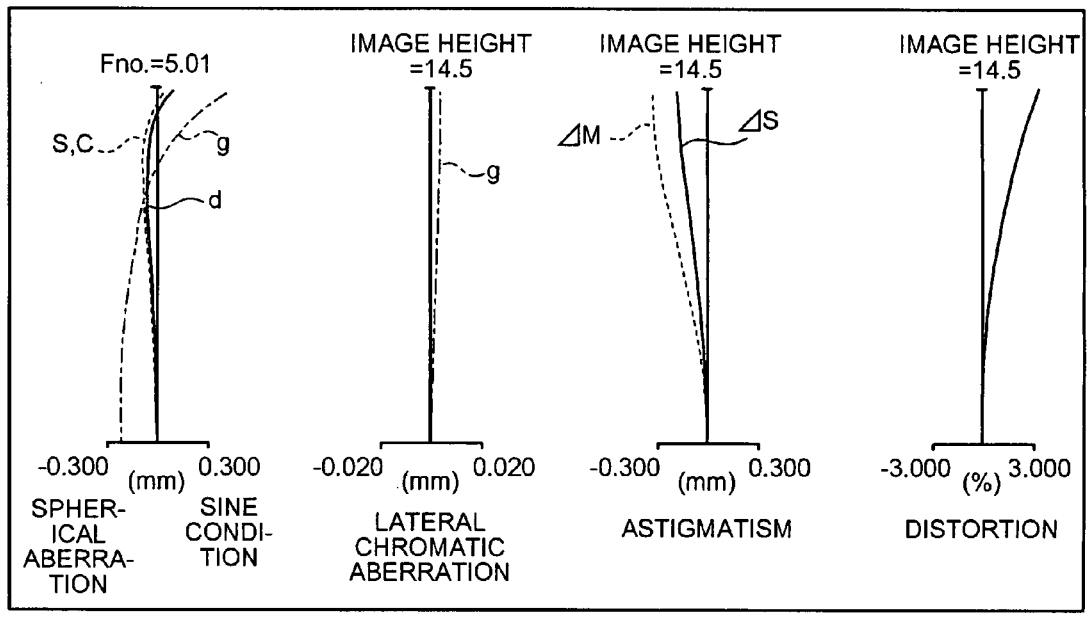
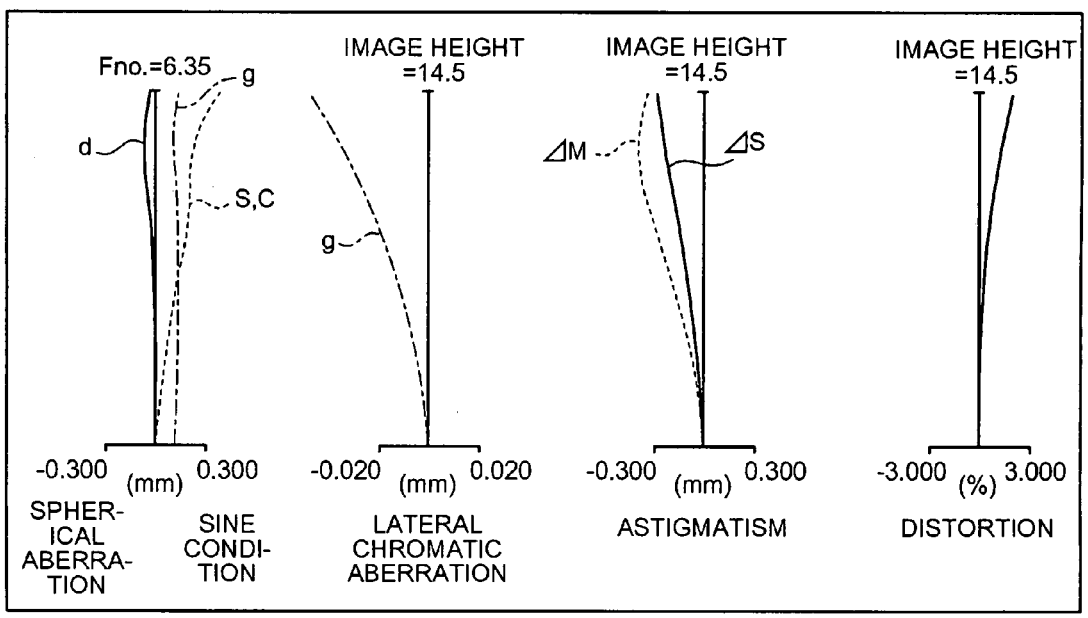

LARGE MAGNIFICATION FACTOR ZOOM LENS

BACKGROUND OF THE INVENTION

1. Field of the Invention

The present invention relates to a compact large-magnification-factor zoom lens having a wider angle of view.

2. Description of the Related Art

Recently, design techniques and manufacturing techniques for optical equipments are advanced and downsize of zoom lenses and increase in magnification factors have become possible. Accordingly, a wide variety of large magnification factor zoom lenses have been proposed (for example, Japanese Patent Laid-Open Publication Nos. 2000-89117, 2002-236255, 2003-241097, 2005-331697, and H11-174327).

Zoom lenses described in the above Patent documents include a first through a fourth lens groups having refractive powers of positive, negative, positive, and positive, respectively, in an order arranged from an object side, thereby achieving an increased magnification factor.

Particularly, the zoom lens described in Japanese Patent Laid-Open Publication No. 2005-331697 has such a feature that, when the zoom lens is used in a digital single-lens reflex camera including an image sensor in an APS-C size installed therein, the zoom lens can ensure a back focus equivalent to that typically possessed by a conventional single-lens reflex camera for a 35 millimeters (mm) film.

Further, the zoom lens described in the Patent document 5 is configured to have six lens groups including a first lens group having a positive refractive power and a second lens group having a negative refractive power in an order arranged from an object side, thereby achieving an increased magnification factor.

Unlike conventional film single-lens reflex cameras, in digital single-lens reflex cameras, attachment of foreign matters onto an imaging device such as a charge-coupled device (CCD) leads to considerable deterioration of a photographed image. To prevent attachment of foreign matters onto imaging devices by allowing the decreased number of times of lens exchange, zoom lenses of large magnification factors are developed. However, such zoom lenses have photographing angles of view of about 75 degrees and F-numbers of about 3 to 4, and zoom lenses having magnification ratios exceeding 13 have not been proposed.

Meanwhile, increased magnification ratios of zoom lenses lead to increased displacements of lens groups as well as increased variations of aberrations, thereby causing a problem that aberration corrections are made difficult over the entire magnification ranges, respectively. To solve this problem, methods are conventionally adopted to conduct aberration correction by decreasing refractive powers of lens groups of a zoom lens, or to conduct aberration correction by forming a surface(s) of one(s) of lenses constituting a zoom lens as an aspherical surface(s). However, decreased refractive powers of the lens groups result in increased displacement of the lens groups upon magnification change and thus in a complicated cam mechanism that supports the zoom lens, thereby newly causing a problem of an increased dimension of the zoom lens in a radically outward direction thereof.

In the zoom lenses described in Japanese Patent Laid-Open Publication Nos. 2000-89117, 2002-236255, and 2003-241097, aspherical surfaces are introduced and third lens groups are each constituted of three lenses, thereby conducting aberration corrections without increasing the number of lenses. According to such configurations, aberration corrections can be conducted without substantial problems, insofar as magnification ratios are limited to about 7 to 10. However, the configurations each suffer from failure of correction of spherical aberrations caused in a first lens group and a second lens group, respectively, at a telephoto end, when the magnification ratio is set to be about 13.

Furthermore, the zoom lens described in Japanese Patent Laid-Open Publication No. 2005-331697 has a magnification ratio of about 7, so that the magnification of the third lens group is rarely made to be about −1 due to magnification change even by decreasing a refractive power of the third lens group. However, if the magnification ratio is increased to about 13 while the configuration is unchanged, a focal length where a magnification is made to be −1 is included, and aberration correction at the third lens group is brought to a limit, thereby causing a problem of deteriorated optical performance of the zoom lens as a whole.

Also, the zoom lens described in the Japanese Patent Laid-Open Publication No. H11-174327 has the same problem as those zoom lenses described in the other Patent documents.

In any case, it is impossible to sufficiently correct aberrations caused at the first and the second lens groups at a telephoto end, when magnification ratios are made to be 13 or more in the configurations of the zoom lenses described in the above Patent documents. This rather leads to increased sensitivities of the third lens groups to aberrations, respectively, thereby causing a problem that even a slight manufacturing error is not allowed.

SUMMARY OF THE INVENTION

It is an object of the present invention to solve at least the above problems in the conventional technologies.

A large magnification factor zoom lens according to one aspect of the present invention includes a first lens group having a positive refractive power; a second lens group having a negative refractive power; a third lens group having a positive refractive power; and a fourth lens group having a positive refractive power. The first lens group, the second lens group, the third lens group, and the fourth lens group are arranged in an order from an object side, and the third lens group includes at least three positive lenses.

A large magnification factor zoom lens according to another aspect of the present invention includes a first lens group having a positive refractive power; a second lens group having a negative refractive power; and a third lens group having a negative refractive power. The first lens group, the second lens group, and the third lens group are arranged in an order from an object side, and the large magnification factor zoom lens is configured so as to satisfy a conditional expression including $$0.35 \leq f_1/f_t \leq 0.45$$

$$0.6 \leq |f_2|/f_w \leq 0.8$$

$$0.15 \leq f_3/f_t \leq 0.3$$

where $f_1$ represents a focal length of the first lens group, $f_2$ represents a focal length of the second lens group, $f_3$ represents a focal length of the third lens group, $f_t$ represents the focal length of an entire zoom lens system at a telephoto end, and $f_w$ represents a focal length of the entire zoom lens system at a wide-angle end.

A large magnification factor zoom lens according to still another aspect of the present invention includes a first lens group having a positive refractive power; a second lens group having a negative refractive power; a third lens group having a positive refractive power; and a fourth lens group having a positive refractive power. The first lens group, the second lens group, the third lens group, and the fourth lens group are arranged in an order from an object side, and the first lens group includes at least two positive lenses.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 7 is a graph of aberrations of the large magnification factor zoom lens according to the second embodiment at a middle end; and FIG. 8 is a graph of aberrations of the large magnification factor zoom lens according to the second embodiment at a telephoto end.

DETAILED DESCRIPTION OF THE PREFERRED EMBODIMENTS

Figure 1:
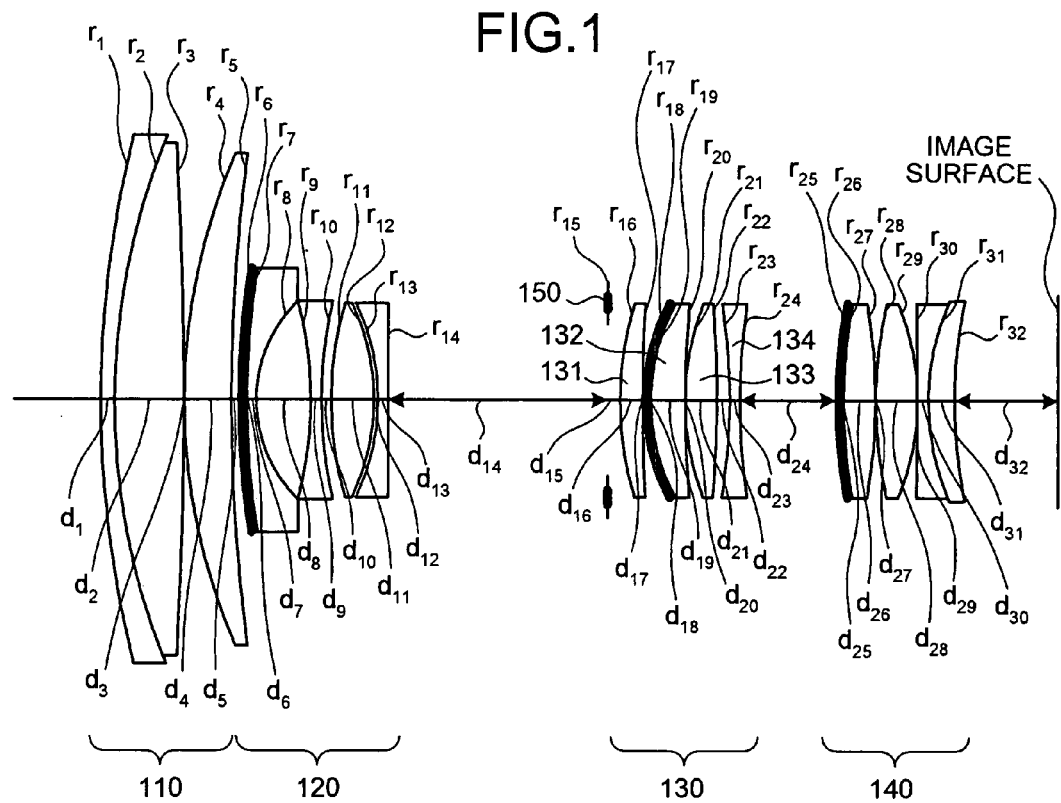
FIG. 1 is a cross-section along an optical axis of a large magnification factor zoom lens according to a first embodiment of the present invention at a wide-angle end.

Exemplary embodiments according to the present invention will be explained below in detail.

The large magnification factor zoom lens according to an embodiment of the present invention includes, in an order arranged from an object side, a first lens group having a positive refractive power, a second lens group having a negative refractive power, a third lens group having a positive refractive power, and a fourth lens group having a positive refractive power.

The large magnification factor zoom lens of this embodiment is configured to conduct a magnification change from a wide-angle end to a telephoto end, by moving the second lens group, the third lens group, and the fourth lens group along the optical axis such that a space between the first lens group and the second lens group is widened, a space between the second lens group and the third lens group is narrowed, and a space between the third lens group and the fourth lens group is narrowed. Further, focusing is conducted by moving the second lens group along the optical axis toward the object side.

The present invention has an object to provide a zoom lens having a wider angle of view and in a compact size capable of keeping a higher optical performance over an entire magnification range and capable of achieving a magnification ratio of about 13. Thus, various conditions are settled as follows, to attain such an object.

First, aberrations to be caused upon large magnification ratios are made significant, thereby requiring to correct such aberrations caused upon the large magnification ratios. It is further required to realize aberration corrections by small-sized lenses, so as to prevent the optical system from being increased in size. It is also required to decrease displacements of the lenses as short as possible upon magnification change, so as to shorten the whole optical system length.

To meet such requirements, it is preferable to satisfy the following conditional expression $$0.35 \leq f_1/f_t \leq 0.45 \quad (1)$$

where $f_1$ represents a focal length of the first lens group, and $f_t$ represents a focal length of the whole zoom lens system at a telephoto end.

The conditional expression (1) defines a ratio of the focal length of the first lens group to the focal length of the large magnification factor zoom lens according to this embodiment at the telephoto end. Ratios less than the lower limit of the conditional expression (1) lead to shortened focal lengths of the first lens group and are thus advantageous in shortening the whole optical system length, but result in difficult correction of aberrations, particularly, spherical aberration and comatic aberration at the telephoto end. Meanwhile, ratios exceeding the upper limit of the conditional expression (1) lead to increased focal lengths of the first lens group and to increased displacements of the first lens group for ensuring the focal length at the telephoto end, thereby causing difficulty in shortening the whole optical system length. Further, the increased displacements of the first lens group lead to a complicated cam structure that controls the movement of the first lens group, thereby causing lenses to be upsized in the radial direction. Moreover, since the distance between the first lens group and the diaphragm is then increased at the telephoto end, light is caused to pass through an edge of the first lens group, thereby bringing about significant occurrence of comatic aberration.

The large magnification factor zoom lens of this embodiment adopts an inner focus scheme where the second lens group is moved toward the object side upon focusing. This requires that a space for conducting focusing is ensured within the optical system, thereby tending to increase the whole optical system length. As such, to shorten the whole length, it is required to restrict the displacement of the second lens group upon focusing by setting the focal length of the second lens group at an appropriate length, and to ensure an optimum back focus. Additionally, it is required to downsize the various lenses constituting the second lens group, and to conduct excellent aberration corrections.

To meet such requirements, it is preferable to satisfy the following conditional expression.

$$0.5 \leq |f_2|/f_w \leq 0.8 \quad (2)$$

where $f_2$ represents a focal length of the second lens group, and $f_w$ represents a focal length of the entire zoom lens system at the wide-angle end.

The conditional expression (2) defines a ratio of the focal length of the second lens group to the focal length of the large magnification factor zoom lens according to this embodiment at the wide-angle end. Ratios less than the lower limit of the conditional expression (2) lead to shortened focal lengths of the second lens group to thereby facilitate obtainment of a back focus equivalent to that of a 35 mm film camera, but corrections of various aberrations, particularly corrections of imaging surface curvature are made difficult. Meanwhile, ratios exceeding the upper limit of the conditional expression (2) lead to increased focal lengths of the second lens group to thereby increase displacements of the second lens group upon magnification change, thereby causing difficulty in shortening the whole optical system length. Further, displacements of the second lens group toward the object side are also increased upon focusing, thereby requiring to widen a space between the first lens group and the second lens group, so that the whole optical system length is lengthened. Furthermore, diameters of lenses constituting the second lens group are also increased, to cause difficulty in downsizing the optical system. Increased lens diameters require adoption of filters having larger apertures to be arranged in the optical system, thereby also bringing about a cause to obstruct the optical system from being downsized.

The large magnification factor zoom lens according to this embodiment enables a large magnification ratio of about 13, and thus tends to cause spherical aberrations particularly upon large magnification ratios. This requires to more effectively correct the spherical aberrations caused upon large magnification ratios. It is also required to refrain from unduly giving importance to aberration corrections such that sensitivities to manufacturing errors are excessively increased. Additionally, it is required to avoid upsizing of the optical system.

To meet such requirements, it is preferable to satisfy $$0.15 \leq f_3/f_t \leq 0.3 \tag{3}$$

where $f_3$ represents a focal length of the third lens group, and $f_t$ represents the focal length of the entire zoom lens system at the telephoto end.

The conditional expression (3) defines a ratio of the focal length of the third lens group to the focal length of the large magnification factor zoom lens according to this embodiment at the telephoto end. Ratios less than the lower limit of the conditional expression (3) lead to shortened focal lengths of the third lens group and are thus advantageous in shortening the entire optical system length, but result in difficult correction of spherical aberrations and increased sensitivities of the optical system to manufacturing errors, thereby considerably deteriorating the optical performance. Meanwhile, ratios exceeding the upper limit of the conditional expression (3) lead to increased focal lengths of the third lens group and to increased displacements of the third lens group upon magnification change, thereby causing difficulty in shortening the entire optical system length. Further, although light flux traveling from the third lens group toward the fourth lens group is made substantially focal, the image-formation magnification of the third lens group at the wide-angle end is made small, thereby causing a problem of decreased amount of edge light at the wide-angle end.

Values of $f_3/f_t$ closer to 0.3, which is the upper limit of the conditional expression (3), tend to cause decreased amounts of edge light. Of course, values of $f_3/f_t$ not exceeding 0.3 are not problematic in practical usage. However, it is ideal for $f_3/f_t$ to satisfy the following conditional expression for ensuring a sufficient amount of edge light, $$0.15 \leq f_3/f_t \leq 0.25 \tag{3'}$$

In this way, corrections of spherical aberrations can be conducted by suitably setting the refractive power of the third lens group by satisfying the conditional expressions (3) or (3)'. However, magnification ratios exceeding 13 may fail to sufficiently correct spherical aberrations caused in the first lens group and the second lens group at the telephoto end. Thus, to satisfactorily correct spherical aberrations caused in the first lens group and the second lens group, the third lens group is desirably constituted of four lenses, i.e., a positive lens, another positive lens, a positive meniscus lens having a larger radius of curvature at an imaging surface side, and a negative lens in an order arranged from an object side. It is further effective for correction of spherical aberration, to form a surface of either of the positive lenses as an aspherical surface. The third lens group may be constituted of five lenses, i.e., a connected lens including a negative lens and a positive lens connected to each other, a positive meniscus lens having a larger radius of curvature at an imaging surface side, a positive lens, and a negative lens. Either way, it is desirable to include three convex lenses. Constituting the third lens group in the above manner allows for excellent corrections of spherical aberrations to be caused in the first lens group and the second lens group upon large magnification ratios. Further, when the magnification ratio is to be more increased, the third lens group is to include therein one more positive lens, which exhibits a more excellent effect for correction of spherical aberration.

Further, chromatic aberrations to be caused in the third lens group upon large magnification ratios are also problematic. Thus, to satisfactorily correct such chromatic aberrations, the third lens group is to desirably include at least one or more positive lenses that each meet the following conditional expression.

$$v_3 \geq 80 \tag{4}$$

where $v_3$ represents an Abbe number of the each lens to be desirably included in the third lens group.

Moreover, since the large magnification factor zoom lens of this embodiment has a larger magnification ratio of about 13, chromatic aberrations to be caused in the first lens group upon large magnification ratios are also problematic.

Thus, to correct chromatic aberrations to be caused in the first lens group at the telephoto end in the large magnification factor zoom lens of this embodiment, the first lens group is to desirably include at least one or more positive lenses that respectively meet the following conditional expression.

$$55 \geq v_1 \leq 95 \tag{5}$$

where $v_1$ represents an Abbe number of the each lens to be desirably included in the first lens group.

When the first lens group is constituted without including a positive lens meeting the conditional expression (5), chromatic aberration (lateral chromatic aberration) to be caused in the first lens group at the telephoto end can not be fully corrected.

In turn, when the first lens group has two positive lenses each having an Abbe number equal to or higher than 80 (and equal to or less than 95), it exhibits an extremely superior effect for correcting the lateral chromatic aberration. However, materials (such as glass, plastics) having Abbe numbers of 80 or more each typically have a refractive index less than 1.5, so that a lens formed of the applicable material has a small radius of curvature. Thus, the lens is required to be thickened at its center, thereby causing a problem of an increased lens diameter.

As such, to downsize the first lens group in the large magnification factor zoom lens of this embodiment, the first lens group is to desirably include at least one or more positive lenses each meeting the following conditional expression.

$$n_1 \geq 1.55 \tag{6}$$

where $n_1$ represents a refractive index of the each lens to be desirably included in the first lens group.

When the first lens group is constituted without including a positive lens meeting the conditional expression (6), the lenses constituting the first lens group are increased in aperture, thickness, and the like, thereby causing difficulty in downsizing the zoom lens as a whole.

As the configuration of the first lens group in view of the above and based on the conditional expressions (5) and (6), the first lens group is to be desirably configured with three positive lenses in such a manner that the Abbe number of the second lens of the first lens group is set from 55 to 80, the Abbe number of the third lens is set from 80 to 95, and any one of the three positive lenses is to have a refractive index equal to or larger than 1.55.

When the large magnification factor zoom lens according to this embodiment meets all the conditional expressions (1) to (6), the former is made to keep a higher optical performance capable of effectively correcting various aberrations over an entire magnification range to thereby establish a large magnification factor zoom lens having a wider angle of view and in a compact size. Further, even without meeting all the conditional expressions (1) to (6), a large magnification factor zoom lens can be realized that has a higher optical performance exhibiting effects specific to the respective conditional expressions insofar as any one of the conditional expressions is met.

The large magnification factor zoom lens according to this embodiment is not necessarily constituted of the four lens groups. Namely, a zoom lens can be provided that is capable of effectively correcting various aberrations over an entire magnification range even by a configuration having three groups or five groups, insofar as the zoom lens includes the first to the third lens groups that meet the conditional expressions (1) to (6).

Note that the effects expected for the present invention can be obtained, when the numerical value ranges defined by the conditional expressions (1) to (6) are met by approximate numerical values, respectively.

Embodiments of the large magnification factor zoom lens according to the present invention will be described hereinafter.

FIG. 1 is a cross-section along an optical axis of a large magnification factor zoom lens configuration according to a first embodiment at a wide-angle end. This large magnification factor zoom lens is configured to include, in an order arranged from an object side not shown, a first lens group 110 having a positive refractive power, a second lens group 120 having a negative refractive power, a third lens group 130 having a positive refractive power, and a fourth lens group 140 having a positive refractive power. Further, arranged between the second lens group 120 and the third lens group 130 is a diaphragm 150.

Particularly, the third lens group 130 is configured to include, in an order arranged from the object side, a positive lens 131, a positive lens 132, a positive meniscus lens 133 having a larger radius of curvature at an imaging surface side, and a negative lens 134. Note that the positive lens 132 has an object side surface formed as an aspherical surface.

This large magnification factor zoom lens is configured to conduct a magnification change from a wide-angle end to a telephoto end by moving the second lens group 120, the third lens group 130, and the fourth lens group 140 along the optical axis such that a space between the first lens group 110 and the second lens group 120 is widened, a space between the second lens group 120 and the third lens group 130 is narrowed, and a space between the third lens group 130 and the fourth lens group 140 is narrowed. Further, focusing is conducted by moving the second lens group 120 along the optical axis toward the object side.

Listed below are various numerical value data concerning the large magnification factor zoom lens according to the first embodiment.

Focal length ($f_w$) of whole zoom lens system at wide-angle end=18.43

Focal length of whole zoom lens system at middle end=57.80

Focal length ($f_t$) of whole zoom lens system at telephoto end=241.85

Fno.=3.38 (wide-angle end) to 4.90 (middle end) to 6.31 (telephoto end)

Angle of view (2ω)=76.4° (wide-angle end) to 28.2° (middle end) to 6.9° (telephoto end)

(Values concerning the conditional expression (1))
Focal length ($f_1$) of first lens group 110=95.50

$f_1/f_t=0.3949$ (Values concerning the conditional expression (2))
Focal length ($f_2$) of second lens group 120=−12.70

$|f_2|/f_w=0.6889$ (Values concerning the conditional expression (3))
Focal length ($f_3$) of third lens group 130=44.09

$f_3/f_t=0.1823$ $r_1=97.4112$ $d_1=1.50\ nd_1=1.84666\ vd_1=23.78$ $r_2=63.6698$ $d_2=6.70\ nd_2=1.49700\ vd_2=81.61$ $r_3=-585.4553$ $d_3=0.20$ $r_4=59.7644$ $d_4=4.50\ nd_3=1.58913\ vd_3=61.18$ $r_5=170.9592$ $d_5=1.172$(wide-angle end) to 29.729(middle end) to 59.021(telephoto end)

$r_6=103.0415$(aspherical surface)

$d_6=0.20\ nd_4=1.51460\ vd_4=49.96$ $r_7=76.4574$ $d_7=1.20\ nd_5=1.80400\ vd_5=46.58$ $r_8=14.0386$ $d_8=5.25$ $r_9=-35.2494$ $d_9=0.90\ nd_6=1.83481\ vd_6=42.72$ $r_{10}=41.0177$ $d_{10}=1.05$ $r_{11}=30.1271$ $d_{11}=4.10\ nd_7=1.84666\ vd_7=23.78$ $r_{12}=-24.8687$ $d_{12}=0.55$ $r_{13}=-20.2000$ $d_{13}=1.00$ $nd_8=1.88300$ $vd_8=40.78$ $r_{14}=-1371.7220$ $d_{14}=23.843$(wide-angle end) to 11.100(middle end) to 0.777(telephoto end)

$r_{15}=\infty$(diaphragm)

$d_{15}=1.00$ $r_{16}=34.2588$ $d_{16}=2.20$ $nd_9=1.49700$ $vd_9=81.61$ $r_{17}=164.1275$ $d_{17}=0.40$ $r_{18}=25.3134$(aspherical surface)

$d_{18}=0.20$ $nd_{10}=1.51460$ $vd_{10}=49.96$ $r_{19}=25.3134$ $d_{19}=2.70$ $nd_{11}=1.48749$ $vd_{11}=70.21$ $r_{20}=192.2800$ $d_{20}=0.40$ $r_{21}=29.8687$ $d_{21}=2.60$ $nd_{12}=1.49700$ $vd_{12}=81.61$ $r_{22}=-87.1832$ $d_{22}=1.50$ $r_{23}=-50.1458$ $d_{23}=0.90$ $nd_{13}=1.83400$ $vd_{13}=37.17$ $r_{24}=49.4943$ $d_{24}=8.422$(wide-angle end) to 4.619(middle end) to 2.678(telephoto end)

$r_{25}=59.4969$(aspherical surface)

$d_{25}=0.20$ $nd_{14}=1.51460$ $vd_{14}=49.96$ $r_{26}=59.4969$ $d_{26}=3.30$ $nd_{15}=1.51680$ $vd_{15}=64.20$ $r_{27}=-37.0270$ $d_{27}=0.20$ $r_{28}=71.5226$ $d_{28}=3.80$ $nd_{16}=1.51680$ $vd_{16}=64.20$ $r_{29}=-24.3419$ $d_{29}=0.20$ $r_{30}=-202.1990$ $d_{30}=0.90$ $nd_{17}=1.80400$ $vd_{17}=46.58$ $r_{31}=20.0493$ $d_{31}=2.60$ $nd_{18}=1.51823$ $vd_{18}=58.96$ $r_{32}=40.0640$ $d_{32}=39.184$(wide-angle end) to 65.989(middle end) to 88.929(telephoto end)

Conical coefficient (A) and aspherical surface coefficient $(A_4, A_6, A_8, A_{10})$ (Sixth Surface)

$A=1.0$ $A_4=9.08092\times10^{-6}$, $A_6=-1.51031\times10^{-8}$, $A_8=1.14419\times10^{-10}$, $A_{10}=-8.20498\times10^{-14}$ (18th Surface)

$A=1.0$ $A_4=-4.43167\times10^{-6}$, $A_6=5.46600\times10^{-9}$, $A_8=-1.88908\times10^{-10}$, $A_{10}=1.14556\times10^{-12}$ (25th Surface)

Figure 2:
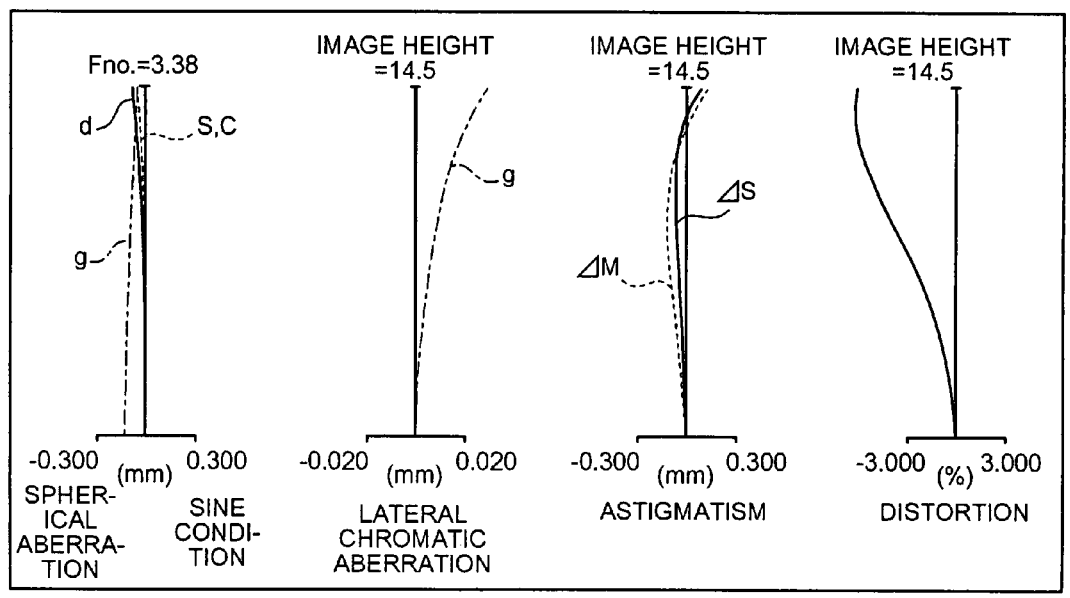
FIG. 2 is a graph of aberrations of the large magnification factor zoom lens according to the first embodiment at the wide-angle end.
Figure 3:
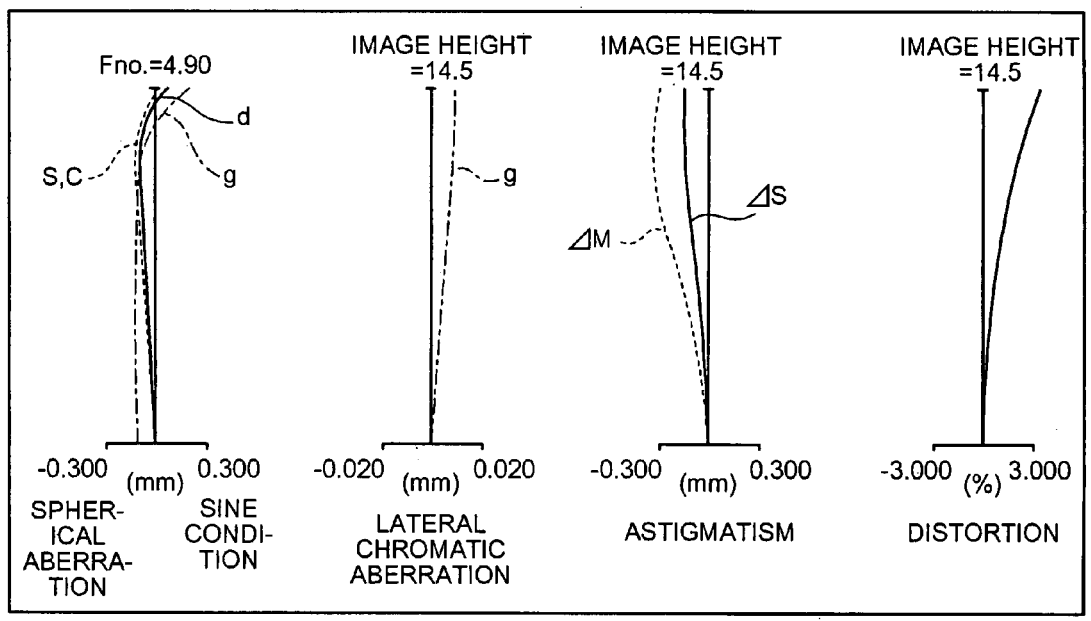
FIG. 3 is a graph of aberrations of the large magnification factor zoom lens according to the first embodiment at a middle end.
Figure 4:
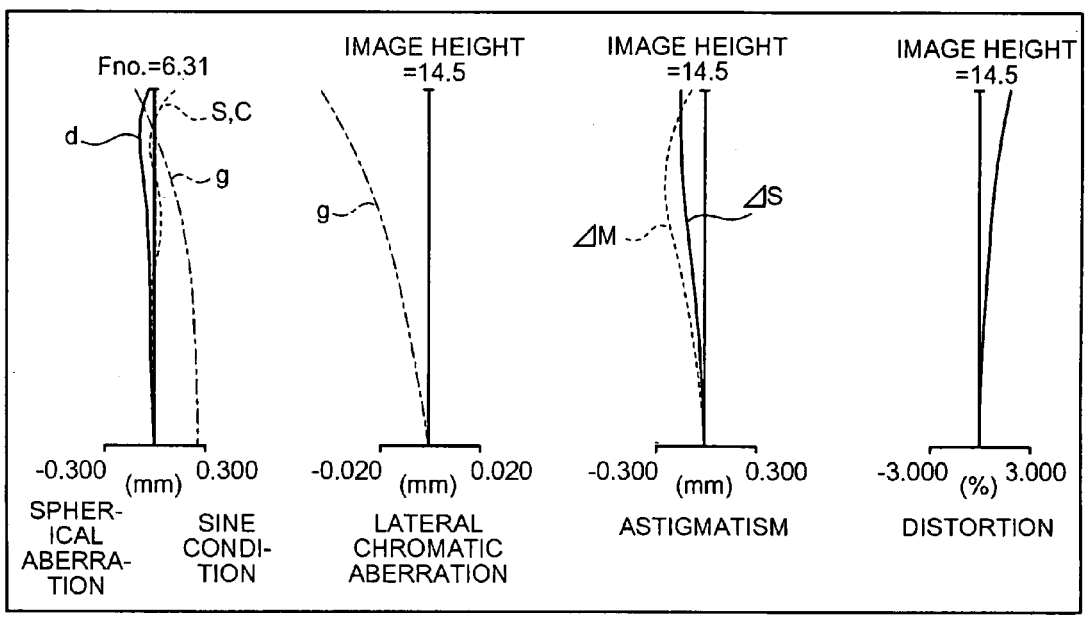
FIG. 4 is a graph of aberrations of the large magnification factor zoom lens according to the first embodiment at a telephoto end.

$A=1.0$ $A_4=-5.88226\times10^{-5}$, $A_6=-3.44654\times10^{-8}$, $A_8=3.63080\times10^{-10}$, $A_{10}=-2.99578\times10^{-12}$ FIG. 2 is a graph of aberrations of the large magnification factor zoom lens according to the first embodiment at the wide-angle end. FIG. 3 is a graph of aberrations of the large magnification factor zoom lens according to the first embodiment at the middle end. FIG. 4 is a graph of aberrations of the large magnification factor zoom lens according to the first embodiment at the telephoto end.

Figure 5:
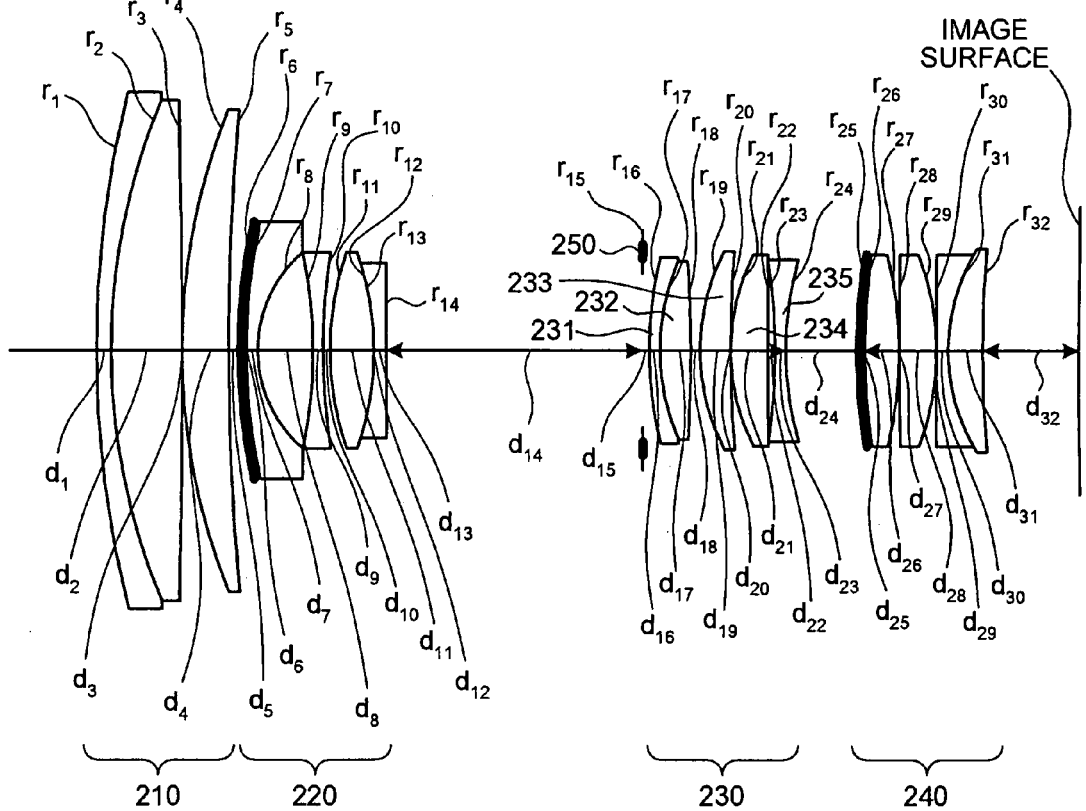
FIG. 5 is a cross-section along an optical axis of a large magnification factor zoom lens configuration according to a second embodiment of the present invention at a wide-angle end.

FIG. 5 is a cross-sectional view along an optical axis of a large magnification factor zoom lens configuration according to a second embodiment of the present invention at a wide-angle end. This large magnification factor zoom lens is configured to include, in an order arranged from an object side not shown, a first lens group 210 having a positive refractive power, a second lens group 220 having a negative refractive power, a third lens group 230 having a positive refractive power, and a fourth lens group 240 having a positive refractive power. Further, arranged between the second lens group 220 and the third lens group 230 is a diaphragm 250.

Particularly, the third lens group 230 is configured to include, in an order arranged from the object side, a negative lens 231, a positive lens 232, a positive meniscus lens 233 having a larger radius of curvature at an imaging surface side, a positive lens 234, and a negative lens 235. Note that the negative lens 231 and the positive lens 232 are connected to each other.

This large magnification factor zoom lens is configured to conduct a magnification change from a wide-angle end to a telephoto end by moving the second lens group 220, the third lens group 230, and the fourth lens group 240 along the optical axis such that a space between the first lens group 210 and the second lens group 220 is widened, a space between the second lens group 220 and the third lens group 230 is narrowed, and a space between the third lens group 230 and the fourth lens group 240 is narrowed. Further, focusing is conducted by moving the second lens group 220 along the optical axis toward the object side.

Listed below are various numerical value data concerning the large magnification factor zoom lens according to the second embodiment.

Focal length ($f_w$) of whole zoom lens system at wide-angle end=18.43

Focal length of whole zoom lens system at middle end=57.80

Focal length ($f_t$) of whole zoom lens system at telephoto end=241.83

Fno.=3.47 (wide-angle end) to 5.01 (middle end) to 6.35 (telephoto end)

Angle of view (2ω)=76.4° (wide-angle end) to 28.2° (middle end) to 6.9° (telephoto end)

(Values concerning the conditional expression (1))
Focal length ($f_1$) of first lens group 210=95.47

$f_1/f_t=0.3948$ (Values concerning the conditional expression (2))
Focal length ($f_2$) of second lens group 220=−12.71

$|f_2|/f_w=0.6897$ (Values concerning the conditional expression (3))
Focal length ($f_3$) of third lens group 230=43.77

$f_3/f_t=0.1810$ $r_1=100.0000$ $d_1=1.50$ $nd_1=1.84666$ $vd_1=23.78$ $r_2=63.5173$ $d_2=7.00$ $nd_2=1.49700$ $vd_2=81.61$ $r_3=-1072.5164$ $d_3=0.20$ $r_4=63.0346$ $d_4=4.50$ $nd_3=1.62299$ $vd_3=58.15$ $r_5=221.5870$ $d_5=1.766$(wide-angle end) to 30.152(middle end) to 59.613(telephoto end)

$r_6=110.0000$(aspherical surface)

$d_6=0.20$ $nd_4=1.51460$ $vd_4=49.96$ $r_7=70.0000$ $d_7=1.20$ $nd_5=1.80400$ $vd_5=46.58$ $r_8=13.5502$ $d_8=5.40$ $r_9=-34.6450$ $d_9=1.00$ $nd_6=1.83481$ $vd_6=42.72$ $r_{10}=53.7020$ $d_{10}=0.80$ $r_{11}=29.1029$ $d_{11}=4.50$ $nd_7=1.84666$ $vd_7=23.78$ $r_{12}=-25.6353$ $d_{12}=0.42$ $r_{13}=-21.2556$ $d_{13}=1.00$ $nd_8=1.88300$ $vd_8=40.78$ $r_{14}=286.1917$ $d_{14}=25.227$(wide-angle end) to 11.984(middle end) to 1.411(telephoto end)

$r_{15}=\infty$(diaphragm)

$d_{15}=1.00$ $r_{16}=38.3469$ $d_{16}=1.00$ $nd_9=1.80400$ $vd_9=46.58$ $r_{17}=25.0994$ $d_{17}=3.00$ $nd_{10}=1.58913$ $vd_{10}=61.18$ $r_{18}=-210.0000$ $d_{18}=1.00$ $r_{19}=24.5206$ $d_{19}=3.00$ $nd_{11}=1.48749$ $vd_{11}=70.21$ $r_{20}=95.0000$ $d_{20}=0.50$ $r_{21}=23.9504$ $d_{21}=3.50$ $nd_{12}=1.49700$ $vd_{12}=81.61$ $r_{22}=746.0130$ $d_{22}=0.65$ $r_{23}=-79.3108$ $d_{23}=1.00$ $nd_{13}=1.83400$ $vd_{13}=37.17$ $r_{24}=35.3648$ $d_{24}=7.782$(wide-angle end) to 3.768(middle end) to 1.982(telephoto end)

$r_{25}=48.5260$(aspherical surface)

$d_{25}=0.20$ $nd_{14}=1.51460$ $vd_{14}=49.96$ $r_{26}=48.5260$ $d_{26}=3.50$ $nd_{15}=1.48749$ $vd_{15}=70.21$ $r_{27}=-35.9079$ $d_{27}=0.20$ $r_{28}=8369.5957$ $d_{28}=3.50$ $nd_{16}=1.48749$ $vd_{16}=70.21$ $r_{29}=-26.5082$ $d_{29}=0.20$ $r_{30}=-533.7180$ $d_{30}=1.00$ $nd_{17}=1.80400$ $vd_{17}=46.58$ $r_{31}=18.7073$ $d_{31}=3.50$ $nd_{18}=1.54072$ $vd_{18}=47.23$ $r_{32}=95.0000$ $d_{32}=39.583$(wide-angle end) to 67.213(middle end) to 89.384(telephoto end)

Conical coefficient (A) and aspherical surface coefficient ($A_4$, $A_6$, $A_8$, $A_{10}$)
(Sixth Surface)

A=1.0

$A_4=6.08226\times10^{-5}$, $A_6=3.27658\times10^{-9}$, $A_8=-8.68205\times10^{-11}$, $A_{10}=4.65488\times10^{-13}$ (25th Surface)

A=1.0

Figure 6:
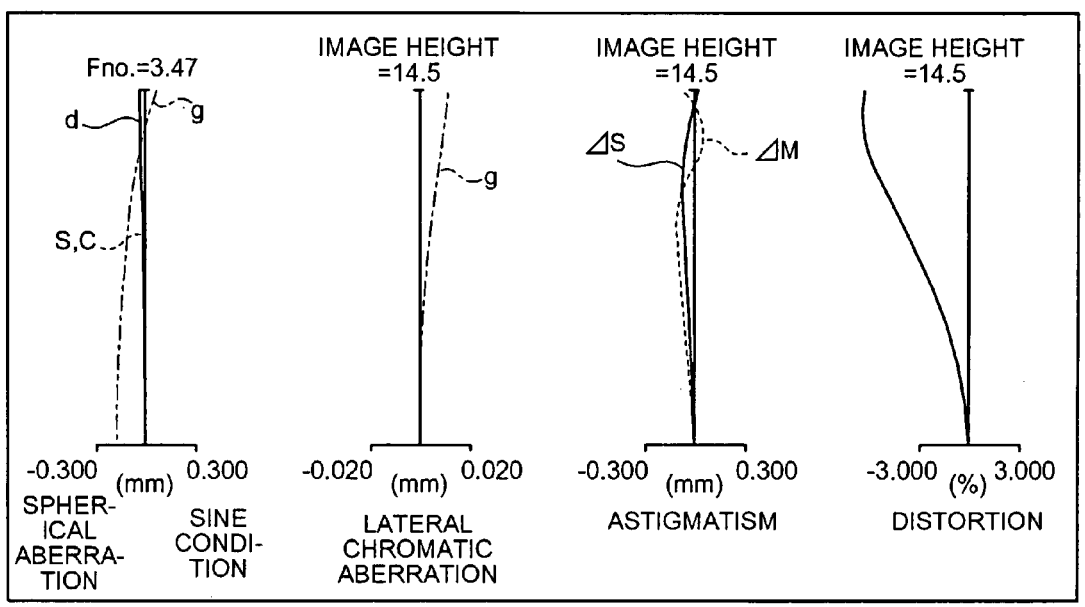
FIG. 6 is a graph of aberrations of the large magnification factor zoom lens according to the second embodiment at the wide-angle end.

$A_4=-4.66282\times10^{-5}$, $A_6=6.30079\times10^{-9}$, $A_8=-1.16447\times10^{-11}$, $A_{10}=-4.36431\times10^{-14}$ FIG. 6 is a graph of aberrations of the large magnification factor zoom lens according to the second embodiment at the wide-angle end. FIG. 7 is a graph of aberrations of the large magnification factor zoom lens according to the second embodiment at the middle end. FIG. 8 is a graph of aberrations of the large magnification factor zoom lens according to the second embodiment at the telephoto end.

Note that, in the numerical value data, $r_1$, $r_2$ . . . represent radii of curvature of surfaces of the lenses and diaphragm, respectively; $d_1$, $d_2$, . . . represent wall thicknesses or surface separations of the lenses and diaphragm, respectively; $nd_1$, $nd_2$, . . . represent refractive indexes of lenses at d-line, respectively; and $vd_1$, $vd_2$, . . . represent Abbe numbers of lenses at d-line, respectively.

The aspherical surface shapes can be each represented by the following equation, where "x" is set in an optical axis direction, "H" represents a height orthogonal to the optical axis, and a traveling direction of light is positive:

$$x = \frac{H^2/r}{1+\sqrt{1-A(H/r)^2}} + A_4 H^4 + A_6 H^6 + A_8 H^8 + A_{10} H^{10} \quad (7)$$

Where r represents a paraxial radius of curvature; A represents a conical coefficient; and $A_4$, $A_6$, $A_8$, and $A_{10}$ represent aspherical surface coefficients at fourth, sixth, eighth, and tenth orders, respectively.

According to the present invention as explained above, a large magnification factor zoom lens can be provided that is capable of effectively correcting various aberrations over an entire magnification range, and having a lower sensitivity to manufacturing errors. Concretely, the large magnification factor zoom lenses according to the present invention meeting the conditional expressions are each allowed to be downsized with a large magnification factor (about 13) and a wide angle of view (about 76°), and each enable aberration corrections in an excellent manner over an entire magnification range. Further, the sensitivity to manufacturing errors can also be kept low.

Furthermore, the large magnification factor zoom lenses according to the present invention are each configured to include a lens formed with an aspherical surface, thereby allowing excellent correction of various aberrations by a small number of lenses.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The present document incorporates by reference the entire contents of Japanese priority document, 2006-171066 filed in Japan on Jun. 21, 2006.

What is claimed is:

1. A large magnification factor zoom lens comprising:
   a first lens group having a positive refractive power;
   a second lens group having a negative refractive power;
   a third lens group having a positive refractive power; and
   a fourth lens group having a positive refractive power,
   wherein
   the first lens group, the second lens group, and the third lens group are arranged in an order from an object side, and
   the large magnification factor zoom lens is configured so as to satisfy the following conditional expressions including $0.35 \leq f_1/f_t \leq 0.45$ $0.6 \leq |f_2|/f_w \leq 0.8$ $0.15 \leq f_3/f_t \leq 0.3$ $6.08 \leq 2\omega(t) \leq 7.82$ where $f_1$ represents a focal length of the first lens group, $f_2$ represents a focal length of the second lens group, $f_3$ represents a focal length of the third lens group, $f_t$ represents the focal length of an entire zoom lens system at a telephoto end, $f_w$ represents a focal length of the entire zoom lens system at a wide-angle end, and $2\omega(t)$ represents angle of view of the entire zoom lens system at the telephoto end.

2. The large magnification factor zoom lens according to claim 1, wherein the third lens group includes at least
   a positive lens; and
   a positive meniscus lens having a large radius of curvature at an imaging surface side.

3. The large magnification factor zoom lens according to claim 2, wherein the positive lens included in the third lens group has an aspherical surface.

4. The large magnification factor zoom lens according to claim 2, wherein the positive lens included in the third lens group is connected to a negative lens.

5. The large magnification factor zoom lens according to claim 1, wherein the third lens group includes three convex lenses.

6. The large magnification factor zoom lens according to claim 1, wherein the third lens group includes at least one positive lens that satisfies a conditional expression, $v_3 \geq 80$ where $v_3$ represents an Abbe number of each lens included in the third lens group.

7. The large magnification factor zoom lens according to claim 1, wherein the first lens group includes at least one positive lens that satisfies a conditional expression, $55 v_1 \leq 95$ where $\nu_1$ represents an Abbe number of each lens included in the first lens group.

8. The large magnification factor zoom lens according to claim 1, wherein the first lens group includes at least one positive lens that satisfies a conditional expression, $n_1 \geq 1.55$ where $n_1$ represents a refractive index of each lens included in the first lens group.

9. The large magnification factor zoom lens according to claim 1, wherein a magnification change from a wide-angle end to a telephoto end is conducted by moving the second lens group, and the third lens group along an optical axis such that a space between the first lens group and the second lens group is widened, and a space between the second lens group and the third lens group is narrowed, and focusing is conducted by moving the second lens group along the optical axis toward the object side.

* * * * *